United States Patent
Markowski

(10) Patent No.: US 8,785,891 B2
(45) Date of Patent: Jul. 22, 2014

(54) ADAPTIVE SHADE WINDOW FOR PLASMA OPERATIONS

(75) Inventor: John E. Markowski, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 219 days.

(21) Appl. No.: 13/448,487

(22) Filed: Apr. 17, 2012

(65) Prior Publication Data

US 2013/0270463 A1    Oct. 17, 2013

(51) Int. Cl.
 *A61N 5/06* (2006.01)
 *G01J 3/10* (2006.01)
 *H05G 2/00* (2006.01)

(52) U.S. Cl.
 USPC .......... 250/504 R; 250/517.1; 349/1; 349/13; 428/678; 428/656; 427/446; 427/398.3; 118/666; 118/668

(58) Field of Classification Search
 USPC ............... 250/504 R; 428/678, 656; 427/446, 427/398.3; 118/666, 668; 349/1, 13
 See application file for complete search history.

(56) References Cited

U.S. PATENT DOCUMENTS

| 4,505,945 A | 3/1985 | Dubust et al. |
| 7,238,916 B2 | 7/2007 | Samodell et al. |
| 2007/0116886 A1 | 5/2007 | Refke et al. |
| 2011/0176072 A1 | 7/2011 | Ge et al. |

FOREIGN PATENT DOCUMENTS

| EP | 0670659 A2 | 9/1995 |
| KR | 20120011532 A | 2/2012 |
| WO | 0029635 A2 | 5/2000 |

OTHER PUBLICATIONS

Patent Cooperation Treaty, International Search Report and Written Opinion, Jun. 10, 2013, 12 pages.

*Primary Examiner* — Jack Berman
*Assistant Examiner* — Meenakshi Sahu
(74) *Attorney, Agent, or Firm* — Kinney & Lange, P.A.

(57) ABSTRACT

An observation window is provided for use with a spray booth during a spray coating process where the observation window is located in a position to permit an operator to observe the spray coating process. The observation window is controlled to provide light transmission in the window suitable for the specific spray process being performed. The control can be automatic or operator controlled. The window is adapted to have a different light transmission during different spray processes such as plasma spray and HVOF spray.

20 Claims, 5 Drawing Sheets

Transmittance Requirements for Clear Lenses
and General-Purpose Filters

| Shade Number | Luminous Transmittance | | | Maximum Effective Far-ultraviolet Average Transmittance | Maximum Infrared Average Transmittance |
|---|---|---|---|---|---|
| | Maximum % | Nominal % | Minimum % | | |
| CLEAR | 100 | ---- | 85 | ---- | ---- |
| 1.5 | 67 | 61.45 | 55 | 0.1 | 25 |
| 1.7 | 55 | 50.1 | 43 | 0.1 | 20 |
| 2.0 | 43 | 37.3 | 29 | 0.1 | 15 |
| 2.5 | 29 | 22.8 | 18.0 | 0.1 | 12 |
| 3.0 | 18.0 | 13.9 | 8.50 | 0.07 | 9.0 |
| 4 | 8.50 | 5.18 | 3.16 | 0.04 | 5.0 |
| 5 | 3.16 | 1.93 | 1.18 | 0.02 | 2.5 |
| 6 | 1.18 | 0.72 | 0.44 | 0.01 | 1.5 |
| 7 | 0.44 | 0.27 | 0.164 | 0.007 | 1.3 |
| 8 | 0.164 | 0.100 | 0.061 | 0.004 | 1.0 |
| 9 | 0.061 | 0.037 | 0.023 | 0.002 | 0.8 |
| 10 | 0.023 | 0.0139 | 0.0085 | 0.001 | 0.6 |
| 11 | 0.0085 | 0.0052 | 0.0032 | 0.0007 | 0.5 |
| 12 | 0.0032 | 0.0019 | 0.0012 | 0.0004 | 0.5 |
| 13 | 0.0012 | 0.00072 | 0.00044 | 0.0002 | 0.4 |
| 14 | 0.00044 | 0.00027 | 0.00016 | 0.0001 | 0.3 |

Fig. 5

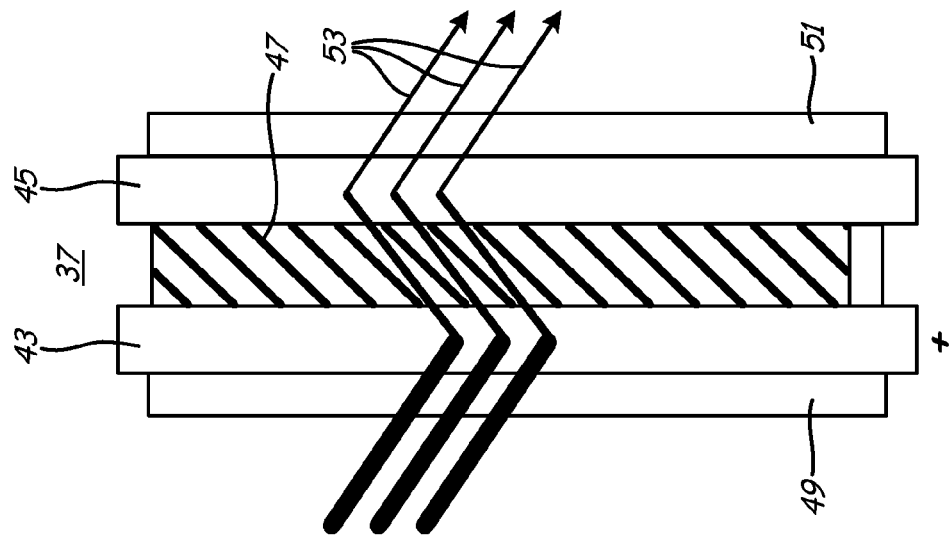
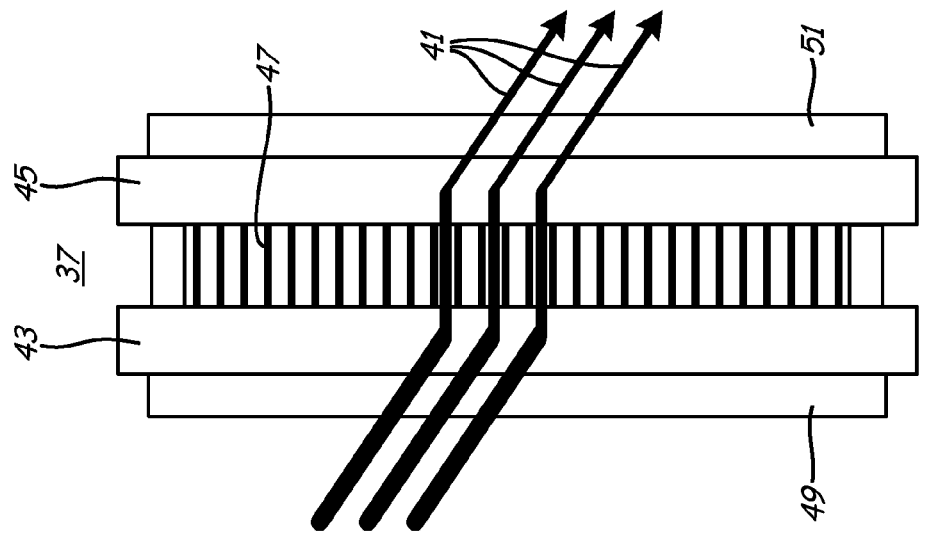

ADAPTIVE SHADE WINDOW FOR PLASMA OPERATIONS

BACKGROUND

Thermal spraying, and particularly plasma spraying and high velocity oxygen fuel (HVOF) spraying, are well established processes used in many metallurgical manufacturing processes. Thermal spraying is done normally in a thermal spray booth or enclosure.

The primary role of a thermal spray enclosure is to contain and/or control various hazards associated with thermal spray processing of materials. Historically, thermal spray booths were used to shield the shop floor from the intense sound pressures, dust and fumes, and ultraviolet light generated during spray operations. In the past years, the introduction of robotics has led to an expanded role for booths as barriers to protect humans from being struck by fast-moving robotic arms. The most modern spray enclosures are now designed to minimize operator exposure to a variety of thermal spray hazards. Spray boxes and fully automated spray booths that do not require an operator to be present in the spray environment are becoming more common, and in many situations have become an accepted requirement.

The use of an enclosed space to reduce hazards has considerably increased the safety of thermal spray operators and shop personnel that work in the vicinity of thermal spray devices. However, an enclosure introduces new hazards that must be addressed. A wide variety of gases are used in thermal spray processing. Unless proper care is taken, it is possible to create dangerous situations within an enclosure. An inert gas leak can displace the air, leading to an asphyxiation hazard. A fuel leak or build-up of an explosive metal powder can set up the possibility of a violent explosion. Thermal spray enclosures must be designed to provide simple egress of operators during an emergency situation. Operators inside a spray booth may be unaware of emergency situations on the shop floor, such as fire alarms, unless special provisions are made.

The thermal spray enclosure is the most important safety device used in thermal spray processing. Because the spray operations are conducted within its confines, all of the energy sources (gas, electricity, and water), the feedstock materials, and all of the process effluents (heat, dust, fumes, sound and ultraviolet light) are present. Proper mitigation of all of these hazards requires careful thought in the design and operation of a spray booth.

One concern that is important is to protect operators from point source radiation generated by thermal spray processes, particularly plasma and high velocity oxy-fuel (HVOF) spray processes. Operators need to view the process so they do not crash the robotic arm holding the spray device. Window tinting for plasma spray is too dark when the chamber is used for HVOF spraying. Conversely, the HVOF tint can cause eye fatigue and irritation when the chamber is used for plasma spraying.

The use of the same thermal spray chamber for plasma spray and HVOF spray processes allows for improved efficiency of a spray facility. Accordingly, allowing the operator to view the spray process without eye fatigue or eye damage is important.

SUMMARY

This invention is a window used for viewing the operation of a thermal spray process in a thermal spray chamber. The window has an adjustable tint shade depending on the thermal spray process being used in the chamber. The window uses electro tinting technology to switch between clear, when no thermal spraying is being done, to a first tint suitable for a first thermal spray process such as plasma spraying, and to a second tint suitable for a second thermal spray process such as HVOF spraying. The spray booth or chamber gas/powder control unit will also include the tinting control circuit.

BRIEF DESCRIPTION OF THE DRAWINGS

FIG. 5 is a table (Table I) that shows transmittance requirements for shade values of the window of this invention.

FIG. 6 is a section view of a window with the light shade not energized.

FIG. 7 is a section view of a window with the light shade energized to produce a dark shade window.

DETAILED DESCRIPTION

Spray coating of parts is performed in many industries. One example is spray coating of parts for gas turbine engines. Plasma spraying produces one type of coating while HVOF spraying produces a different type of coating. It is desirable to use the same spray booth or chamber for both processes, as well as for other spray processes, because mounting the specific spray gun on the gun mount of the robotic arm is the only change in equipment needed.

The steps in using the present invention, 10 generally, involve placing a part on a mount in a spray booth or chamber in step 11. When the specific spray process is known, the coating gun for that process is mounted on a gun mount interface in step 13. The operator who will be observing and/or controlling the spray process then adjusts the shade of the observation window in step 15. This can be done manually or automatically.

In some instances, simply mounting a specific coating gun will send a signal to adjust the shade of the observation window. The robotic control system that runs a predetermined spray control program would call out the shade in a program routine and trigger a relay or controller to switch the shade on or off. A key type system can also do that instead, if manual control is wanted. When the gun is bolted on to the robot in step 13, a sensor or switch is either tripped or not tripped by the way the gun is mounted onto the robot.

Step 17 is an optional step to fine tune the precise shade darkness of the observation window using a potentiometer as described below. The part is then spray coated using the coating gun in step 19. When the spraying is complete, the gun is turned off and the part removed, in step 21, the shade of the operating window can manually or automatically return to clear since there is no need to protect the operator from the lights.

Figure 2:
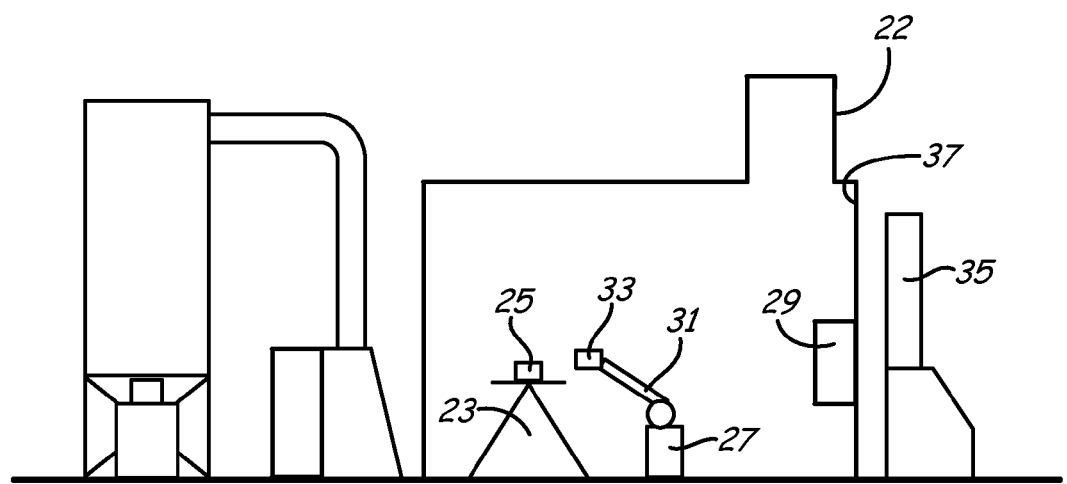
FIG. 2 is a schematic view of a thermal spray booth used for multiple spray processes such as plasma spraying and HVOF spraying.

FIG. 2 shows a typical spray booth configuration 22, with a mount 23 for holding a part 25 proximate the spray equipment 27. Booth controls for controlling the spray process are located in control box 29 and contain the program used by the robotic arm 31 and coating gun 33. Coating gun 33 may be a plasma spray gun, a HVOF spray gun, or other similar spray guns.

Figure 3:
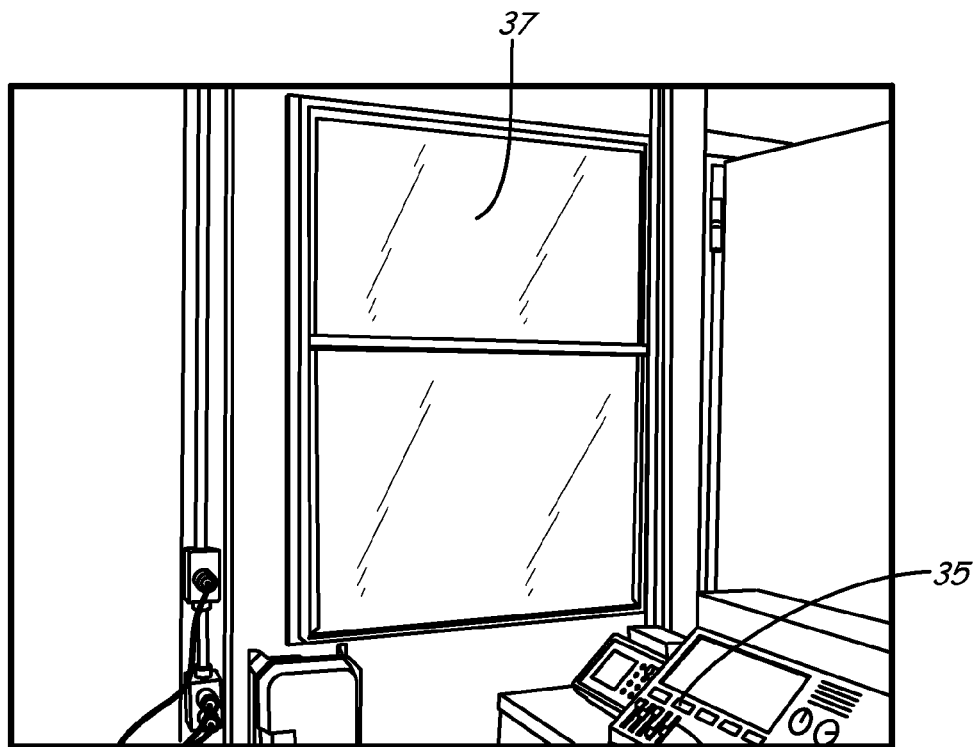
FIG. 3 is a view of a window adjusted in tint for HVOF spraying.
Figure 4:
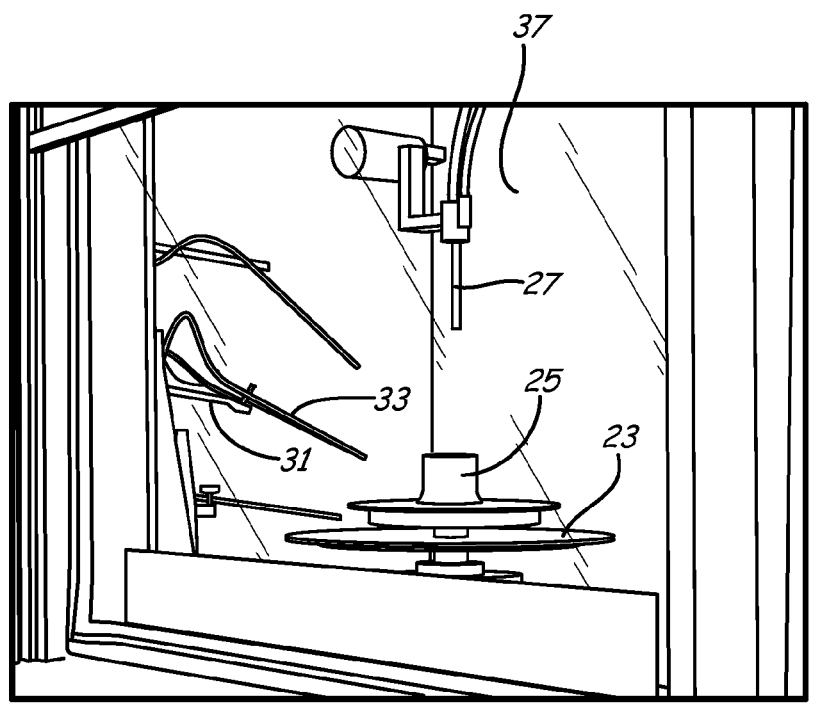
FIG. 4 is a view of a window adjusted in tint for plasma spraying.

The operator is positioned at operator control console 35 shown in FIG. 2 and FIG. 3 where the operator can view the operation through window 37. FIG. 3 shows the relationship between window 37, which is controlled to have appropriate shading, and the operator control console 35, outside spray booth 22. FIG. 4 illustrates the inside of spray booth 22 as seen from the outside by an operator. Mount 23 holds part 25 so that spray equipment 27 can perform a spray process using robotic arm 31 and coating gun 33.

Window 37 can be pre-set at different shades of darkness for different spraying processes. The robotic control system that runs the spraying process according to a recipe that identifies the shade needed for that process and trigger a relay to switch the shade on or off. Alternatively a key type system for the operator can be used. In any case, window 37 is set to operate for the specific spray system such as plasma spray or HVOF spray. The spray system is mounted to a robot via a gun mount bolt and at that point a sensor/switch is either tripped or not tripped by the way the gun is mounted to the robot.

FIG. 5 is Table 1 showing the transmittance for various shades that the window is set at, from clear to shade number 14. The specific values of luminous transmittance for shades ranging from 9 to 12 and 6 to 8 can be identified.

When the booth is used for plasma spray coating, the ultraviolet light produced has a wavelength ranging from 280 to 220 nanometers at greater than 30 W/m$^2$. Window 37 would be darkened to a shade ranging from 9 to 12. HVOF ultraviolet light at grater than 30 W/m$^2$ has a peak wavelength of 280 to 360 nanometers. Window 37 would be darkened to a shade ranging from 6 to 8.

Liquid crystal windows use liquid crystals, which are a state of matter having properties between those of a conventional liquid and those of a solid crystal. Liquid crystals find wide use in liquid crystal displays that rely on the optical properties of certain liquid crystalline substances in the presence or absence of an electrical field. In a typical device, a liquid crystal layer sits between two polarizers that are crossed (oriented at 90° to one another). The liquid crystal alignment is chosen so that its relaxed phase is a twisted one. This twisted phase reorients light that has passed through the first polarizer, allowing its transmission through the second polarizer. The device thus appears transparent. When an electric field is applied to the LC layer, the long molecular axes tend to align parallel to the electric field thus gradually untwisting in the center of the liquid crystal layer. In the state, the LC molecules do not reorient light, so the light polarized at the first polarizer is absorbed at the second polarizer, and the device loses transparency with increasing voltage.

Alternatively, the liquid crystals can be oriented as shown in FIGS. 6 and 7, as follows. The light transmission of window 37 is controlled by changing the voltage potential of a window constructed as shown in FIG. 6. Light, shown by arrows 41 passes through two panes of glass 43 and 45, with liquid crystal 47 between the panes. In FIG. 6, the light shade is not energized and light (and therefore vision) passes freely through glass 43, liquid crystal 47 and pane 45. The liquid crystals have elongated molecules that lay parallel to each other, as shown in FIG. 6.

FIG. 7 illustrates a dark shade energized window. When a current is applied to polarizers 49 and 51, liquid crystal 47 rotates to a closed position when energized. Thus the amount of light that passes through window panes 43 and 45 is reduced, shown by arrows 53. Looking through the window when liquid crystals 47 are at 90 degrees to the pane surfaces, the darkest shade is seen. If viewed through an angle of less than 90 degrees, the shading appears lighter, having values such as those in FIG. 5 Table 1. This essentially is a venetian blind effect, known in the art as angle dependency.

Figure 1:
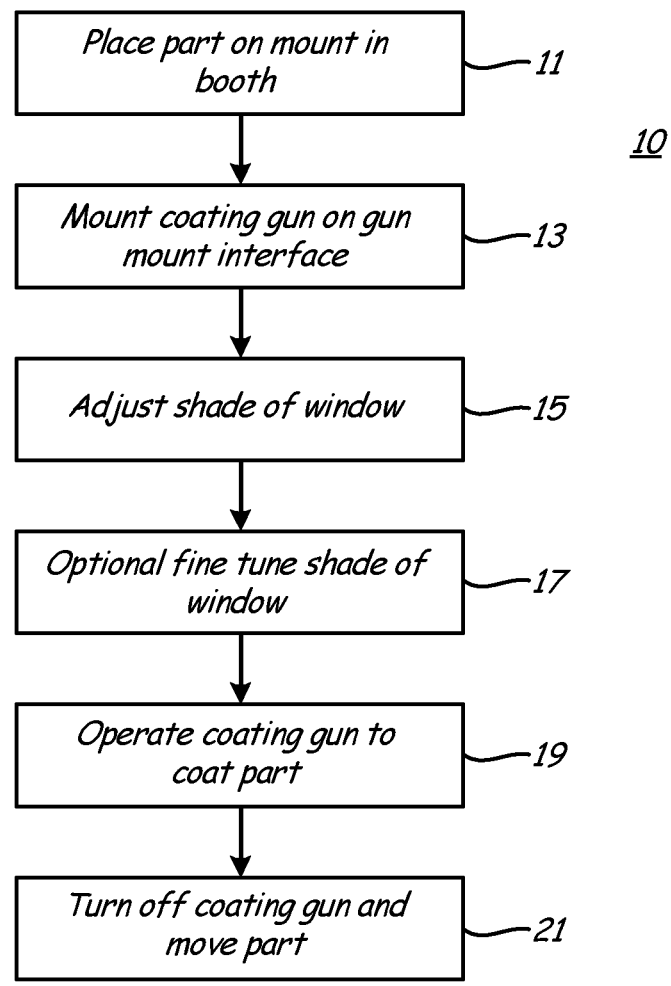
FIG. 1 is a diagram showing the steps of process of this invention.

A voltage potential between polarizers 49 and 51 makes window 37 darker or lighter, depending on the liquid crystal density or alignment needed to block light. The more voltage used and the polarity of the voltage would cause liquid crystals 47 to align between panes 43 and 45 to function the way a venetian blind would function, as described above. The more current or voltage, the darker the glass would get because more liquid crystals would be activated. This can be fine tuned with a potentiometer in step 17 of FIG. 1, and shown schematically in FIG. 3 at 35a. To reverse the process, the voltage or current flow is reversed to reorient liquid crystals 47 to reorient to their original state.

A spray booth for plasma spray coating and HVOF spray coating with separate shades for window 37 that is used by the operator to monitor the movement of the spray gun effectively protected the operator's eyes from any damage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of protecting the vision of a spray booth spray process operator, the method comprising:
providing an observation window for use by the operator;
selecting a spray process; and
controlling light transmission through the observation window as a function of the selected spray process to prevent transmission of ultraviolet light through the observation window.

2. The method of claim 1, wherein the spray process is selected from plasma spray process and HVOF spray process.

3. The method of claim 1, wherein selection of the spray process automatically controls the light transmission of the observation window.

4. The method of claim 3, further comprising:
fine-tuning the light transmission using a manual operator control in conjunction with automatic control.

5. The method of claim 1, wherein the operator controls the shade of the observation window during the spray process.

6. A spray booth window for use with a spray booth for spray coating an object, the window comprising:
the observation window being positioned to permit an operator to observe the spray coating from outside the spray booth; and
a control for adjusting the light transmission of the observation window as a function of a selected spray process.

7. The spray booth of claim 6, wherein the spray process is selected from plasma spray process and HVOF spray process.

8. The spray booth of claim 6, wherein selection of the spray process automatically controls the shade of the observation window.

9. The spray booth of claim 8, further comprising:
a potentiometer to fine tune the light transmission in conjunction with automatic control.

10. The spray booth of claim 6, wherein the operator controls the light transmission of the observation window during the spray process.

11. The spray booth of claim 6, wherein selection of the specific spray process gun determines the light transmission of the observation window during use of the specific spray process gun.

12. The spray booth of claim 7, wherein the light transmittance of the observation window ranges during plasma spray coating from a maximum percentage of 0.061 to 0.0032 and a minimum percentage of 0.023 to 0.0012 and during HVOF spray coating from a maximum percentage of 1.18 to 0.164 and a minimum percentage of 0.44 to 0.061.

13. In a spray booth having at least two spray process guns, a place to mount a part to be spray coated, and a control panel for controlling a spray process, the improvement comprising:
   an observation window positioned to permit an operator to observe the spray process from outside the spray booth; and
   a control for adjusting the light transmission of the observation window.

14. The spray booth of claim 13, wherein the control automatically controls the light transmission of the observation window.

15. The spray booth of claim 14, further comprising:
   a fine-tuning control to fine tune the light transmission in conjunction with automatic control.

16. The spray booth of claim 13, wherein selection of the specific spray process gun determines the light transmission of the observation window during use of the specific spray process gun.

17. The spray booth of claim 13, wherein the light transmittance of the observation window ranges during plasma spray coating from a maximum percentage of 0.061 to 0.0032 and a minimum percentage of 0.023 to 0.0012 and during HVOF spray coating from a maximum percentage of 1.18 to 0.164 and a minimum percentage of 0.44 to 0.061.

18. The method of claim 1, wherein light transmission through the observation window is controlled by varying the voltage applied to liquid crystals arranged between two polarizers in the observation window with increased voltage causing the liquid crystals to align to prevent ultraviolet light from transmitting through the observation window.

19. The spray booth of claim 6, the observation window further comprising:
   two polarizers on the observation window; and
   liquid crystals between the two polarizers, the liquid crystals configured to align to prevent ultraviolet light from transmitting through the observation window as a function of voltage applied to the liquid crystals.

20. The spray booth of claim 13, the observation window further comprising:
   two polarizers on the observation window; and
   liquid crystals between the two polarizers, the liquid crystals configured to align to prevent ultraviolet light from transmitting through the observation window as a function of voltage applied to the liquid crystals.

* * * * *